US011663791B1

(12) United States Patent
Pratt et al.

(10) Patent No.: US 11,663,791 B1
(45) Date of Patent: May 30, 2023

(54) DYNAMIC AVATARS FOR CUSTOMER SUPPORT APPLICATIONS

(71) Applicant: AT&T INTELLECTUAL PROPERTY I, L.P., Atlanta, GA (US)

(72) Inventors: James Pratt, Round Rock, TX (US); Yupeng Jia, Austin, TX (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/455,177

(22) Filed: Nov. 16, 2021

(51) Int. Cl.
*G06T 19/00* (2011.01)
*G10L 15/18* (2013.01)
*G10L 25/63* (2013.01)
*G06T 19/20* (2011.01)
*G06Q 30/016* (2023.01)
*G10L 15/22* (2006.01)
*G06T 13/40* (2011.01)

(52) U.S. Cl.
CPC ......... *G06T 19/006* (2013.01); *G06Q 30/016* (2013.01); *G06T 13/40* (2013.01); *G06T 19/20* (2013.01); *G10L 15/1815* (2013.01); *G10L 15/22* (2013.01); *G10L 25/63* (2013.01); *G06T 2219/2016* (2013.01)

(58) Field of Classification Search
None
See application file for complete search history.

(56) References Cited

U.S. PATENT DOCUMENTS

| 2014/0267313 | A1* | 9/2014 | Marsella | G06T 13/205 345/474 |
| 2021/0286424 | A1* | 9/2021 | Ivanovitch | G06T 19/20 |

OTHER PUBLICATIONS

Følstad et al., Chatbots for Customer Service: User Experience and Motivation, Aug. 22, 2019, 1-9 (Year: 2019).*
Pratt et al., "Augmented Reality Object Manipulation", U.S. Appl. No. 17/403,611, filed Aug. 16, 2021.

* cited by examiner

*Primary Examiner* — Robert J Craddock (57) ABSTRACT

An example method includes identifying a need and an emotional state of a user who is participating in an interaction with a support application, retrieving a set of preferences for the user, selecting a set of features for an avatar to be presented to the user, wherein the set of features is selected based at least on the emotional state of the user and the set of preferences, selecting a stored workflow based on the need of the user, and rendering the avatar to exhibit the set of features and to present the stored workflow as part of the interaction.

20 Claims, 3 Drawing Sheets

DYNAMIC AVATARS FOR CUSTOMER SUPPORT APPLICATIONS

The present disclosure relates generally to extended reality applications, and relates more particularly to devices, non-transitory computer-readable media, and methods for providing dynamic avatars for customer support applications.

BACKGROUND

Customer support applications assist customers with planning, installing, troubleshooting, maintaining, upgrading, and/or disposing of products and services. For instance, a customer may utilize a customer support application to perform a banking transaction, to guide them through the self-installation of a piece of customer premises hardware (e.g., a set top box, a router, or the like), to troubleshoot a computing application, to return a purchased item to an ecommerce business, or the like.

Over time, customer support applications have evolved from human-driven systems, in which a customer typically interacted with a human customer support representative in real time during regular business hours, to automated systems such as interactive voice response (IVR) systems and chatbots, which may allow a customer to access assistance more quickly and at any time of day.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and systems for providing dynamic avatars for customer support applications. In one example, a method performed by a processing system includes identifying a need and an emotional state of a user who is participating in an interaction with a support application, retrieving a set of preferences for the user, selecting a set of features for an avatar to be presented to the user, wherein the set of features is selected based at least on the emotional state of the user and the set of preferences, selecting a stored workflow based on the need of the user, and rendering the avatar to exhibit the set of features and to present the stored workflow as part of the interaction.

In another example, a non-transitory computer-readable medium may store instructions which, when executed by a processing system in a communications network, cause the processing system to perform operations. The operations may include identifying a need and an emotional state of a user who is participating in an interaction with a support application, retrieving a set of preferences for the user, selecting a set of features for an avatar to be presented to the user, wherein the set of features is selected based at least on the emotional state of the user and the set of preferences, selecting a stored workflow based on the need of the user, and rendering the avatar to exhibit the set of features and to present the stored workflow as part of the interaction.

In another example, a device may include a processing system including at least one processor and non-transitory computer-readable medium storing instructions which, when executed by the processing system when deployed in a communications network, cause the processing system to perform operations. The operations may include identifying a need and an emotional state of a user who is participating in an interaction with a support application, retrieving a set of preferences for the user, selecting a set of features for an avatar to be presented to the user, wherein the set of features is selected based at least on the emotional state of the user and the set of preferences, selecting a stored workflow based on the need of the user, and rendering the avatar to exhibit the set of features and to present the stored workflow as part of the interaction.

As discussed above, customer support applications have evolved from human-driven systems, in which a customer typically interacted with a human customer support representative in real time during regular business hours, to automated systems such as interactive voice response (IVR) systems and chatbots, which may allow a customer to access assistance more quickly and at any time of day. However, although automated systems have greatly improved the efficiency and convenience of customer support applications, automated systems are not without their own limitations. For instance, many IVR systems may be capable of responding to only a limited set of inputs (e.g., say "yes," "no," or "I don't know") and may provide only a limited set of prerecorded outputs. Similarly, many chatbots may be programmed to provide assistance for only a narrow set of situations (e.g., return a purchase, report a problem with a purchase, or request a refund). Thus, state of the art automated customer support systems may not be capable of helping customers with a broader range of needs or of helping customers with broad ranges of learning abilities, emotional states, and the like.

Examples of the present disclosure utilize extended reality technologies to generate a dynamic, avatar-based system for providing customer support. In particular, examples of the present disclosure generate a just-in-time avatar that is customized for a customer's specific context, personality, and mood. For instance, the appearance, sound, and/or presentation style of the avatar may be dynamically adapted responsive to the customer's context, personality, and mood. Thus, the just-in-time avatar may provide customer support in a manner that is more engaging for the customer as well as better tailored to the customer's specific needs.

As such, customer support may be provided in a manner that at least maintains the efficiency and convenience of state of the art automated applications, while improving the ability of the customer support application to satisfactorily respond to diverse customer issues. In some examples, a customized avatar such as those disclosed herein may interact with a customer in order to collect an initial set of information which may aid a human customer support representative in responding to the customer. The customer may be transferred to the human customer support representative for further assistance, and the information collected by the customized avatar may help the human customer support representative to provide a resolution for the customer in a quicker manner. This may allow the human customer service representative to assist a greater number of customers in a fixed period of time than if the human customer service representative were acting without the assistance of the customized avatar. Moreover, the information collected by the customized avatar may be used to direct the customer to one of a plurality of possible human customer service representatives who may be best equipped (e.g., based on knowledge, personality, or the like) to assist the customer.

Although examples of the present disclosure are discussed within the context of customer support applications, it will be appreciated that the examples described herein could apply equally to any application in which a human user may interact with an automated system for the purposes of enhancing knowledge or understanding. For instance, customized avatars such as those disclosed herein could be employed in conjunction with educational applications (e.g., review courses, cooking tutorials, musical instrument lessons, etc.) and the like to adapt to the abilities of diverse learners.

Figure 1:
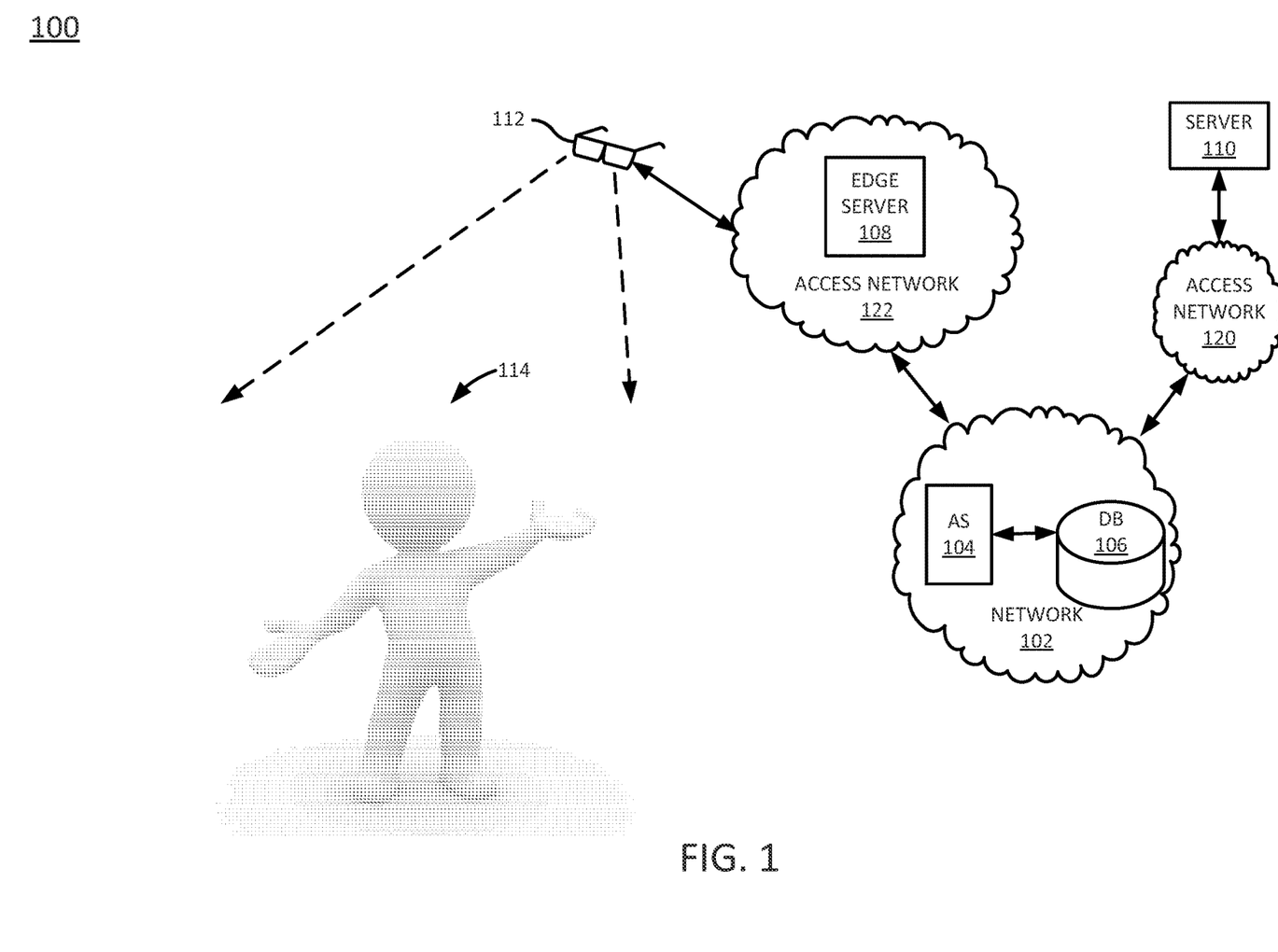
FIG. 1 illustrates an example system in which examples of the present disclosure may operate.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 3:
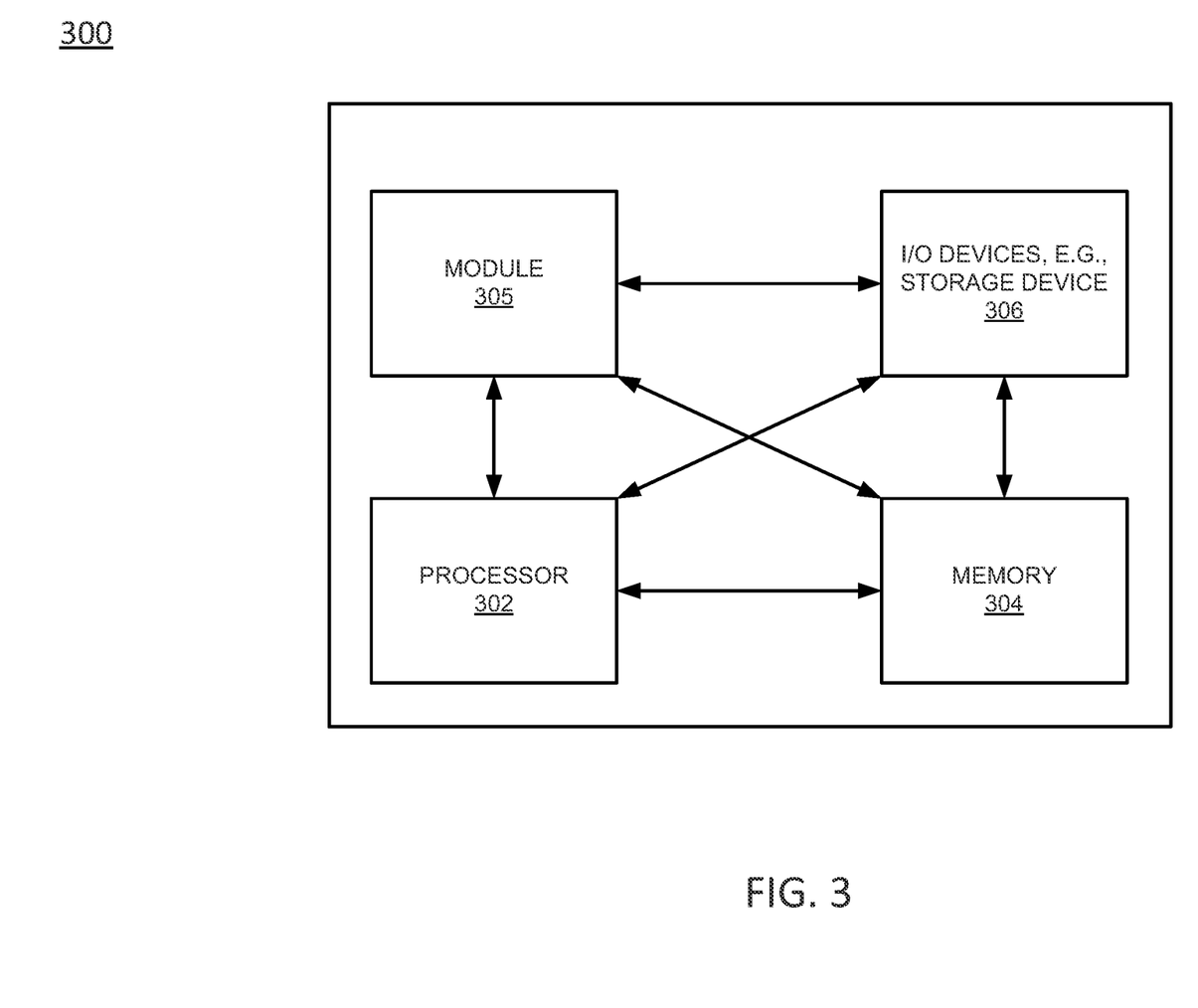
FIG. 3 illustrates an example of a computing device, or computing system, specifically programmed to perform the steps, functions, blocks, and/or operations described herein.

In accordance with the present disclosure, network 102 may include an application server (AS) 104, which may comprise a computing system or server, such as computing system 300 depicted in FIG. 3, and may be configured to provide one or more operations or functions in connection with examples of the present disclosure for providing dynamic avatars for customer support applications. The network 102 may also include a database (DB) 106 that is communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure. Thus, although only a single application server (AS) 104 and single database (DB) are illustrated, it should be noted that any number of servers may be deployed, and which may operate in a distributed and/or coordinated manner as a processing system to perform operations in connection with the present disclosure.

In one example, AS 104 may comprise a centralized network-based server for generating extended reality (XR) environments. For instance, the AS 104 may host an application that renders immersive XR environments which are accessible by users utilizing various user endpoint devices. In one example, the AS 104 may be configured to monitor a user who has connected to a customer support application and to dynamically render an avatar to provide customer support to the user responsive to the monitoring. For instance, the AS 104 may adjust the avatar's appearance (e.g., to resemble someone the user knows personally, a famous person or character, etc.), sound (e.g., tone of voice, cadence, accent, etc.), personality (e.g., upbeat, businesslike, etc.) to mirror the user or to match the user's preferences. The AS 104 may also access specific knowledge bases to provide the avatar with the capability to address the specific customer support issue for which the user has connected to the customer support application (e.g., installing hardware, troubleshooting software, facilitating a return of a purchase, etc.).

In one example, AS 104 may comprise a physical storage device (e.g., a database server), to store profiles for different users of a customer support application. For instance, the AS 104 may store, for each user, a profile which specifies information about the user as well as the user's preferences with respect to the physical appearance, sound, and/or personality of an avatar that is presented for customer support purposes. The information about the user may include a user name (e.g., the user's actual name or another identifier by which the user is identified to the customer support application), preferred language, educational background (e.g., subject areas in which the user is believed to have or not have some knowledge), unique communication needs (e.g., whether the user has hearing or vision impairments), customer support history (e.g., needs for which the user previously sought support, avatars and/or workflows previously rendered for the user and if the user responded positively or negatively to those avatars and workflows, etc.), and goods and services to which the user is subscribed or to which the user is known to have access.

The user's preferences may indicate the user's preferences with respect to the physical appearance, sound, and/or personality of a customer support avatar, as discussed above. For instance, an avatar's physical appearance may be customized to resemble the likeness of someone who the user knows, or of a famous person or character who the user likes. The avatar's sound may be customized to use a particular language, tone of voice, or accent. The avatar's personality may be customized to be calm and soothing, businesslike, funny, or the like. The user's preferences with respect to the avatar's physical appearance, sound, and/or personality, may be used to customize an avatar for the user, as discussed in further detail below.

In a further example, the AS 104 may also store workflows for various user needs that may be addressed by the customer support application. The stored workflows may be specific to the operator of the customer support application. For instance, if the customer support application is operated or provided by a telecommunications network service provider, the stored workflows may pertain to the installation and troubleshooting of telecommunications hardware and software. If the customer support application is operated or provided by an ecommerce business, then the stored workflows may pertain to the purchase, exchange, and return of merchandise. If the customer support application is operated or provided by a business in the travel industry, then the stored workflows may pertain to the booking, changing, and cancellation of travel arrangements (e.g., airline tickets, hotel reservations, restaurant reservations, theme park tickets, ground transportation services, etc.).

In a further example, the AS 104 may store data for use in customizing avatars for users. For instance, the AS 104 may store data that can be used to render an avatar with specific physical, audible, or personality features. In a further example, some of this data may comprise licensed content, such as the likeness or voice of a famous person or of a licensed character from a movie or television show.

In one example, the DB 106 may store the user profiles, workflows, and/or customization data, and the AS 104 may retrieve the user profiles, workflows, and/or customization data from the DB 106 when needed. For ease of illustration, various additional elements of network 102 are omitted from FIG. 1.

Figure 2:
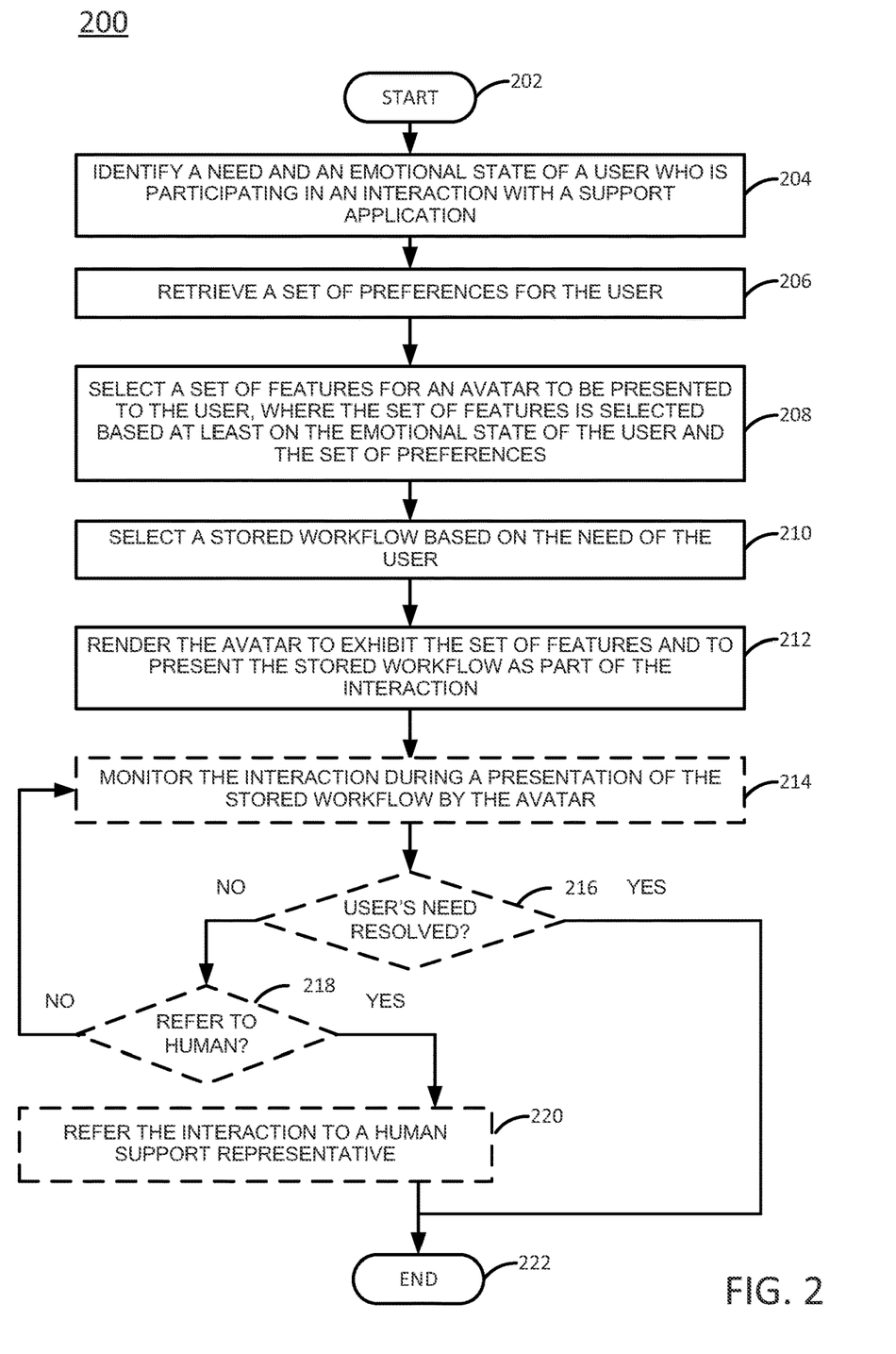
FIG. 2 illustrates a flowchart of an example method for providing dynamic avatars for customer support applications, in accordance with the present disclosure.

In one example, access network 122 may include an edge server 108, which may comprise a computing system or server, such as computing system 300 depicted in FIG. 3, and may be configured to provide one or more operations or functions for providing dynamic avatars for customer support applications, as described herein. For instance, an example method 200 for providing dynamic avatars for customer support applications is illustrated in FIG. 2 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110. Similarly, access network 122 may be in communication with one or more devices, e.g., a user endpoint device 112. Access networks 120 and 122 may transmit and receive communications between server 110, user endpoint device 112, application server (AS) 104, other components of network 102, devices reachable via the Internet in general, and so forth. In one example, user endpoint device 112 may comprise a mobile device, a cellular smart phone, a wearable computing device (e.g., smart glasses, smart goggles, a virtual reality (VR) headset or other types of head mounted display, or the like), a laptop computer, a tablet computer, or the like (broadly an "XR device"). In one example, user endpoint device 112 may comprise a computing system or device, such as computing system 300 depicted in FIG. 3, and may be configured to provide one or more operations or functions in connection with examples of the present disclosure for providing dynamic avatars for customer support applications.

In one example, server 110 may comprise a network-based server for generating XR environments. In this regard, server 110 may comprise the same or similar components as those of AS 104 and may provide the same or similar functions. Thus, any examples described herein with respect to AS 104 may similarly apply to server 110, and vice versa. In particular, server 110 may be a component of an XR system operated by an entity that is not a telecommunications network operator. For instance, a provider of an XR system may operate server 110 and may also operate edge server 108 in accordance with an arrangement with a telecommunication service provider offering edge computing resources to third-parties. However, in another example, a telecommunication network service provider may operate network 102 and access network 122, and may also provide an XR system via AS 104 and edge server 108. For instance, in such an example, the XR system may comprise an additional service that may be offered to subscribers, e.g., in addition to network access services, telephony services, traditional television services, media delivery service, and so forth.

In an illustrative example, an XR system may be provided via AS 104 and edge server 108. In one example, a user may engage an application on user endpoint device 112 (e.g., an "XR device") to establish one or more sessions with the XR system, e.g., a connection to edge server 108 (or a connection to edge server 108 and a connection to AS 104). In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between user endpoint device 112 and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, user endpoint device 112 may communicate with access network 122, network 102, the Internet in general, etc., via a WLAN that interfaces with access network 122.

In the example of FIG. 1, user endpoint device 112 may establish a session with edge server 108 for accessing or joining an XR environment. For illustrative purposes, the XR environment may comprise a customer support environment in which a customer support avatar 114 is presented.

In one example, the customer support avatar 114 may be viewed by a user through the user endpoint device 112, e.g., on a display of a head mounted display or mobile phone, or through a set of smart glasses. The customer support avatar 114 may be rendered in three-dimensions, such that a user may rotate the avatar or zoom in or out on the avatar to adjust a view of the avatar.

Additionally, although the customer support avatar 114 illustrated in FIG. 1 is shown in a generic or featureless form, various features of the customer support avatar 114 may be customized based on a user's needs and/or preferences. For instance, the customer support avatar 114 could be rendered with long hair or short hair, with a specific color of eyes, could be short or tall, could be dressed in a specific style or costume, or could be rendered to resemble a specific real person or fictional character. The customer support avatar 114 could also be rendered to speak with a specific voice or to behave according to a specific personality type, as discussed in further detail below. Moreover, actions of the customer support avatar 114 could also be controlled to act out or simulate specific actions that a user is being instructed to perform.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

FIG. 2 illustrates a flowchart of an example method 200 for providing dynamic avatars for customer support applications, in accordance with the present disclosure. In one example, steps, functions and/or operations of the method 200 may be performed by a device as illustrated in FIG. 1, e.g., AS 104 or any one or more components thereof. In one example, the steps, functions, or operations of method 200 may be performed by a computing device or system 300, and/or a processing system 302 as described in connection with FIG. 3 below. For instance, the computing device 300 may represent at least a portion of the AS 104 in accordance with the present disclosure. For illustrative purposes, the method 200 is described in greater detail below in connection with an example performed by a processing system, such as processing system 302.

The method 200 begins in step 202. In step 204, the processing system may identify a need and an emotional state of a user who is participating in an interaction with a support application. In one example, the support application may be a customer support application designed to assist customers with planning, installing, troubleshooting, maintaining, upgrading, and/or disposing of products and services. In another example, however, the support application may be an educational application designed to provide educational support (e.g., review courses, cooking tutorials, musical instrument lessons, etc.) to students. In one example, the user may access the support application via a user endpoint device such as a computer or a smart phone. In a further example, the user may access the support application via a virtual reality device such as a set of smart glasses, smart goggles, a VR headset, other types of head mounted display, or the like.

In one example, the processing system may identify the need of the user based on information explicitly provided by the user. For example, if the interaction is being at least partially conducted using an IVR system, the user may state aloud the reason (broadly a need) for the interaction (e.g., "I need help installing a set top box," "I need help configuring software for a set top box," etc.). The user may also type the reason for the interaction, or type one or more keywords from which the reason can be inferred, into a field of a web-based portal that is used to access the support application, or may select the reason from among a predefined menu of help topics (e.g., where the menu of help topics may be provided as a plurality of links, as a drop down menu, or in another form).

In a further example, the processing system may infer the need of the user based on observations provided by sensors that are collecting data about the user and/or the user's current environment. The sensors may be distributed throughout the user's current environment and/or integrated into an endpoint device that the user is using during the interaction. For instance, a microphone in the user's environment may capture the user saying, "Why can't I get a signal?" Similarly, a camera in the user's current environment may capture still or video images of a set top box being handled by the user, where the images may also show evidence that the set top box is not functioning properly (e.g., a light emitting diode associated with a malfunction is lit, an audio alert associated with a malfunction is being emitted, etc.).

In one example, the processing system may infer the emotional state of the user based on observations provided by the sensors. For instance, audio of the user captured by a microphone may indicate that the user has expressed frustration (e.g., "Why won't this work?" or "What am I doing wrong?"), or that the user's tone of voice is frustrated (e.g., the user is raising their voice, making frustrated noises, etc.). Still or video images of the user captured by a camera may show the user's facial expressions, which may be analyzed using facial analysis techniques to infer an emotion or mood (e.g., frustrated, confused, calm, amused, etc.). Biometric measurements of the user captured by biometric sensors may be analyzed to predict an emotion or mood (e.g., a heart rate or blood pressure above a threshold may indicate that the user is angry or agitated, while a heart rate or blood pressure below the threshold may indicate that the user is relatively calm).

In a further example, the processing system may infer the emotional state of the user based on sentiment analysis of utterances of the user (e.g., spoken and/or typed) which may be captured by the sensors. For instance, if an utterance contains one or more swear words, the processing system may infer that the user is angry or frustrated. However, if the utterance is polite (e.g., the user says "please" when asking for help), this may indicate that the user is relatively calm. If the user stumbles over their words or starts and stops when speaking, this may indicate that the user is confused.

In step 206, the processing system may retrieve a set of preferences (one or more preferences) for the user. For instance, in one example, a database may store profiles for known users of the support application, where each profile may contain preferences for a respective known user. The preferences may include preferences that the user explicitly provided (e.g., when registering as a user with the support application) and/or preferences that are learned by the processing system over previous interactions with the user.

In one example, the preferences may pertain to an appearance of an avatar that is presented to assist the user. For instance, the preferences may indicate that the user prefers an avatar who looks like someone the user knows personally, like a famous person, or like a favorite movie or television character of the user. The preferences may also indicate whether the user prefers an avatar with a persona that is more casual (e.g., dressed in jeans) or businesslike (e.g., dressed in a suit).

In another example, the preferences may pertain to a sound of the avatar. For instance, the preferences may indicate that the user prefers an avatar who speaks with a calm, soothing voice versus an avatar who speaks loudly. The preferences may also indicate that the user prefers an avatar who shares a voice with a famous person or a favorite movie or television character. The preferences may also indicate a language, dialect, and/or accent that the user prefers for the avatar to speak.

In another example, the preferences may pertain to a personality of the avatar. For instance, the preferences may indicate that the user prefers an avatar who presents help in a very straightforward or businesslike manner as opposed to an avatar who presents help in a laid back manner.

In another example, the profile for the user may indicate the user's preferred language, educational background (e.g., subject areas in which the user is believed to have or not have some knowledge), unique communication needs (e.g., whether the user has hearing or vision impairments), customer support history (e.g., needs for which the user previously sought support, avatars and/or workflows previously rendered for the user and if the user responded positively or negatively to those avatars and workflows, etc.), and goods and services to which the user is subscribed or to which the user is known to have access. The profile may also indicate whether the user prefers an avatar who engages in small talk or "cuts to the chase."

In one example, the processing system may identify the user before retrieving the user's set of preferences. For instance, if the support application requires a user to log in with a user identifier and/or password, the processing system may identify the user from the log in and use the user's identity to locate the correct profile for the user. In another example, the processing system may utilize facial recognition techniques to analyze an image of the user, or may utilize voice recognition techniques to analyze an audio clip of the user. In another example, the processing system may identify the user based on analysis of one or more biometric characteristics (e.g., fingerprint analysis, ocular recognition, etc.). In another example, the user may simply state their identity (e.g., verbally or by typing into a web-based portal).

In step 208, the processing system may select a set of features (one or more features) for an avatar to be presented to the user, where the set of features is selected based at least on the emotional state of the user and the set of preferences. For instance, physical features of the avatar may be selected based on the user's preferences for the avatar's appearance. As an example, the processing system may select an appearance for the avatar that matches an appearance of the user's favorite actor or movie or television character. The processing system may also select a voice, a personality, or other characteristics for the avatar based on the user's preferences. For instance, if the user's emotional state is inferred to be agitated or frustrated, then a voice may be selected for the avatar that is designed to be calm and soothing. Similarly, if the user's emotional state is inferred to be confused, then a personality may be selected for the avatar that is patient and that explains things in a simple manner.

In step 210, the processing system may select a stored workflow based on the need of the user. For instance, having identified the need of the user, the processing system may match the need to a workflow that is stored in a database of workflows. In one example, the need may be matched to the workflow based on keyword matching (e.g., a keyword associated with the need is matched to a metadata tag associated with the workflow). For instance, if the user states aloud that he or she needs help installing a set top box, then the processing system may select a workflow for self-installation of a set top box. In another example, the workflow may be associated with a link or a menu selection that is selected by the user via a web-based portal.

The workflow may comprise a series of steps or tasks that, if performed to completion, is expected to resolve the user's need. For instance, if the user's need is associated with the return of a purchased item, then the workflow may comprise steps including identifying the item to be returned, identifying an order number associated with the item to be returned, confirming that the item to be returned is eligible to be returned, identifying a reason for the return of the item, generating a mailing return label for the user to attach to a package in which to return the item, and sending the mailing return label to the user.

In another example, the processing system may add steps to or remove steps from a generic workflow, where the added or removed steps may be related to the identity or current sentiment (as perceived by the processing system) of the user for whom the workflow is to be performed. Steps related to the user's identity or current sentiment may not necessarily be steps that are needed to resolve the user's need, strictly speaking, but may make the interaction feel more personalized for the user. For instance, if the user's identity or current sentiment (and historical interaction with the avatar system) indicate that the user likes to talk briefly about family, then the avatar may include a step of talking about the user's family in the generic workflow. Similarly, if the user's identity or current sentiment (and historical interaction with the avatar system) indicate that it would be appropriate, the processing system may include workflow steps which present advertisements for additional products or services (potentially from a separate recommendation system).

In yet another example, the processing system may determine (e.g., using sentiment analysis) that the user's perceived frustration manifested with service performance issues (e.g., poor latency or bandwidth usage) only within the last day. The determination may be made in conjunction with conversation analysis, near analysis of the conversation from the processing system, or performance data associated with a service account of the user. In response, the processing system may cause the avatar to perform additional diagnostic workflow steps, such as asking about recent user activities (e.g., changes in behavior), the user's operating environment (e.g., new equipment or changes in reliability (e.g., power issues) in a home), or the user's social cohort (e.g., whether there are additional family members or relatives utilizing a service or experiencing similar performance issues). While these workflow steps may be included in the known set of steps for an avatar, the workflow steps may be executed at the discretion of the processing system, e.g., after the detection of specific emotion or sentiment cues.

In step 212, the processing system may render the avatar to exhibit the set of features and to present the stored workflow as part of the interaction. For instance, in one example, the avatar may be rendered as an XR object (e.g., in a volumetric or three-dimensional video presentation) with which the user may interact. The appearance, sound, and personality of the avatar may be rendered to match the set of features. The avatar may guide the user, step by step, through the steps of the workflow, e.g., providing instructions for the user to take specific actions, confirming that the user has witnessed specific events or results, asking the user questions when needed for further information, and the like.

In one example, the rendering of the avatar may be limited by the user endpoint device on which the avatar is to be rendered. For instance, the processing system may render the avatar as a voice only presentation if the user endpoint device does not have a display or other means of showing a visual aid. The complexity of a visible avatar could also be reduced if the user endpoint device is not capable of displaying complex graphics (e.g., cannot render three-dimensional visuals).

In one example, where the avatar is rendered in three-dimensions, the view of the avatar may be controllable by the user. For instance, the user may be able to rotate the view of the avatar, zoom in or out, or the like. This may allow the user to better view any actions that the avatar may be demonstrating (e.g., to see over the avatar's shoulder, to see specifically what the avatar's hands are doing, etc.). Alternatively, the processing system may autonomously determine, based on context, that the view of the avatar should be rotated, zoomed in, zoomed out, or the like to best demonstrate a task to the user.

In optional step 214 (illustrated in phantom), the processing system may monitor the interaction during a presentation of the stored workflow by the avatar. In one example, the monitoring may include tracking a progress of the workflow (e.g., tracking which steps have been completed, which step is currently being performed, which steps have yet to be completed, etc.) and collecting data as each step of the workflow is performed. For instance, the processing system may collect still and/or video images, audio clips, biometric data, and other sensor data as the workflow is presented to the user and as the user interacts with the avatar to complete the steps of the workflow.

The collected data may help the processing system to determine when the workflow is not progressing as expected or as needed to resolve the user's need. For instance, the user may get stuck on a particular step of the workflow and may become frustrated, despite the avatar's assistance. The step may involve confirming that a visual indicator on a set top box is lighting up to indicate that the set top box is connected to a home network. The user may indicate that the visual indicator is not lighting up, despite the user's belief that they have been correctly following the instructions presented by the avatar. The collected data may include video showing the steps that the user has performed, which may or may not match the steps that the avatar as instructed the user to perform. Thus, the failure of the visual indicator to light up may be a result of an equipment failure, a problem with the network, or human error.

In optional 216 (illustrated in phantom), the processing system may determine whether the user's need has been resolved by the interaction. In one example, the user's need may be determined to have been resolved by the interaction if the stored workflow is completed successfully. In another example, the processing system may confirm whether the user's need has been resolved by directly asking the user to provide a response to a query (e.g., "Has your issue been resolved? Y/N"). In one example, the processing system may determine that the user's need has not been resolved by the interaction if the stored workflow has not been completed or if the user answers "no" to a query asking whether the user's need has been resolved.

If the processing system determines in step 216 that the user's need has been resolved by the interaction, then the processing system may proceed to step 222, and the method 200 may end.

If, however, the processing system determines in step 216 that the user's need has not been resolved by the interaction, then the processing system may proceed to optional step 218 (illustrated in phantom), and the processing system may determine whether the interaction should be referred to a human support representative. For instance, as discussed above, the processing system may determine, based on the collected data, that the stored workflow has not been completed, and that the user has been stuck on the same step of the stored workflow for longer than a threshold period of time (e.g., more than "x" minutes, e.g., where x being 5 minutes or 10 minutes, and the like). The processing system may also detect, based on the collected data, that the user is becoming frustrated, angry, and/or confused. In such an instance, the processing system may determine that it would be appropriate to refer the interaction to a human support representative for further assistance (e.g., that resolution of the user's need may be beyond the capabilities of the processing system).

If the processing system determines in step 218 that the interaction should be referred to a human support representative, then the processing system may proceed to optional step 220 (illustrated in phantom), and the processing system may refer the interaction to a human support representative. In one example, the processing system may refer to the interaction to a human support representative who is known to have experience or knowledge related to the user's need. For instance, if the user is having trouble self-installing a set top box, the processing system may refer the interaction to a human support representative who is known to have experience guiding users through self-installation of set top boxes.

In one example, the interaction may be referred to the human support representative by joining the human support representative to the interaction. For instance, the processing system may initiate a voice or video call to the human support representative, or may initiate a text-based chat session with the human support representative. In another example, if the human support representative is not immediately available to join the interaction, the processing system may place the interaction in a queue or may indicate to the user that the human support representative will contact the user at a later time.

In one example, the human support representative may be presented with any data that was collected during the monitoring which may aid the human support representative in providing assistance to the user. For instance, if the user is unable to confirm that a set top box is connected to a home network (e.g., as indicated by a visual indicator on the set top box lighting up), the human support representative may be presented with information indicating which steps of the self-installation workflow have been successfully completed by the user, images of the set top box and any physical connections that the user has made to the set top box, audio clips of any audible error alerts emitted by the set top box, and/or data that may assist the human support representative in connecting the set top box to the home network (e.g., a network identifier, a network password, current connection strength of the network, error logs generated by one or more devices in the home network, etc.).

In another example, the human support representative may be preemptively notified by the processing system that the avatar cannot solve the current workflow and user disparity (e.g., the user may not have provided enough information to disambiguate between two or more situations). In this case, a communication back channel (e.g., chat, voice message, text notifications, etc.) can be sent by the processing system to a human support representative who may quickly review the communication between the user and the avatar and suggest alternative workflow steps for the avatar to execute. In this way, the immersion and engagement of the user with the avatar is not disrupted, but there are additional workflow steps that the human support representative may introduce as part of the interaction. In a further example, the human support representative may control the avatar with visual, textual, and/or spoken prompts that the avatar may record and reenact using the avatar's own likeness.

If, however, the processing system determines in step 218 that the interaction should not be referred to a human support representative, then the processing system may return to step 214 and may continue to monitor the interaction as described above. Thus, the method 200 continues to present a workflow to a user, via an avatar that is customized for the user, until the user's need is resolved. If and when deemed necessary by the processing system, a human support representative may be consulted to complete the workflow.

The method 200 therefore improves the automation of customer support applications by providing avatars that are customized not just for specific customer support workflows, but also for the specific customers seeking support. Thus, the customers' experience with the customer support application may be more satisfying and more effective, as the avatars may be tailored to individual customers' preferences, emotional states, and/or learning styles. As such, customer support may be provided in a manner that at least maintains the efficiency and convenience of state of the art automated applications, while improving the ability of the customer support application to satisfactorily respond to diverse customer issues.

In one example, individuals or media property owners may license their likenesses or characters for use in rendering avatars according to the method 200. For instance, a famous actor may receive a royalty each time the processing system renders an avatar with his voice and/or likeness per a user's preferences. Similarly, a media company may license its animated characters' voices and/or likenesses for use in customizing avatars per user preferences. In one example, a library of licensed likenesses and characters may be maintained and made searchable so that users may browse the available likenesses and characters. In a further example, increased or premium levels of customization may be available to users who subscribe to a paid tier of customer support service, while a free tier of customer support service may allow for more basic customizations.

In further examples, the method 200 could be used to start a customer support interaction when a human customer support representative is not immediately available. For instance, a low-resolution avatar of the human customer support representative could be presented to a user and used to collect data about the user's need, so that when the human customer support representative is available, the human support representative can resolve the user's need in a more efficient manner.

Customized avatars of the type described herein may be useful in a variety of contexts. For instance, as discussed above, a customized avatar could be used to guide a user through installation of equipment where the user encounters an unknown object or where a piece of equipment or a service may not be supported by a first-party company. In this case, volumetric views of the avatar may be rendered for a highly informative how-to demonstration.

In another example, a customized avatar may be utilized to provide just-in-time guidance for a user in retail environments (e.g., rendered as a VR attendant in stores).

In another example, a customized avatar may be utilized to provide educational or expert information. For instance, a customized avatar could be rendered to provide a three-dimensional demonstration of how to skin a fish or play a chord on the guitar. Similarly, a customized avatar could be rendered with the voice and likeness of a famous person to provide cooking instructions (e.g., a celebrity chef describing how to make a particular dish). A customized avatar could also be rendered as a trainer to help a user perform physical exercises effectively and safely. In all cases, the customized avatar may allow for a more engaging experience for the user.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for providing dynamic avatars for customer support applications, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for providing dynamic avatars for customer support applications (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for providing dynamic avatars for customer support applications (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   identifying, by a processing system including at least one processor, a need and an emotional state of a user who is participating in an interaction with a support application;
   retrieving, by the processing system, a set of preferences for the user;
   selecting, by the processing system, a set of features for a support avatar with which the user is to interact during the interaction, wherein the set of features is selected to be responsive to the emotional state of the user and to be consistent with the set of preferences;
   selecting, by the processing system, a stored workflow based on the need of the user; and rendering, by the processing system, the support avatar to exhibit the set of features and to present the stored workflow as part of the interaction.

2. The method of claim 1, wherein the need of the user is identified based on information explicitly received from the user.

3. The method of claim 1, wherein the need of the user is inferred based on an observation provided by a sensor that is collecting data about the user and a current environment of the user.

4. The method of claim 1, wherein the emotional state of the user is inferred based on an observation provided by a sensor that is collecting data about the user and a current environment of the user.

5. The method of claim 4, wherein the sensor comprises at least one of: a camera, a microphone, or a biometric sensor.

6. The method of claim 1, wherein the emotional state of the user is inferred based on sentiment analysis of an utterance of the user.

7. The method of claim 1, wherein the set of preferences specifies a preferred physical appearance of the support avatar.

8. The method of claim 1, wherein the set of preferences specifies a preferred sound of the support avatar.

9. The method of claim 1, wherein the set of preferences specifies a preferred personality of the support avatar.

10. The method of claim 1, wherein the stored workflow comprises a series of steps or tasks that, when performed to completion, is expected to resolve the need of the user.

11. The method of claim 10, wherein the series of steps or tasks comprises a series of generic steps or tasks that is customizable based on at least one of: an identity of the user, the emotional state of the user, or the set of preferences.

12. The method of claim 1, wherein the support avatar is rendered as an extended reality object, and a view of the support avatar is controllable by the user in three dimensions.

13. The method of claim 1, further comprising:
monitoring, by the processing system, the interaction during a presentation of the stored workflow by the support avatar; and
referring, by the processing system when the monitoring indicates that the need of the user has not been resolved by the interaction, the interaction to a human support representative.

14. The method of claim 13, wherein the need of the user is determined to have not been resolved by the interaction when the stored workflow is not completed successfully.

15. The method of claim 13, wherein the need of the user is determined to have not been resolved by the interaction when the user has been stuck on a same step of the stored workflow for a threshold period of time.

16. The method of claim 13, wherein the need of the user is determined to have not been resolved by the interaction when the user is detected becoming frustrated by the interaction.

17. The method of claim 13, wherein the monitoring comprises collecting data as steps of the stored workflow are performed by the user.

18. The method of claim 17, wherein the data is presented to the human support representative.

19. A non-transitory computer-readable medium storing instructions which, when executed by a processing system including at least one processor, cause the processing system to perform operations, the operations comprising:
identifying a need and an emotional state of a user who is participating in an interaction with a support application;
retrieving a set of preferences for the user;
selecting a set of features for a support avatar with which the user is to interact during the interaction, wherein the set of features is selected to be responsive to the emotional state of the user and to be consistent with the set of preferences;
selecting a stored workflow based on the need of the user; and
rendering the support avatar to exhibit the set of features and to present the stored workflow as part of the interaction.

20. A device comprising:
a processing system including at least one processor; and
a non-transitory computer-readable medium storing instructions which, when executed by the processing system, cause the processing system to perform operations, the operations comprising:
identifying a need and an emotional state of a user who is participating in an interaction with a support application;
retrieving a set of preferences for the user;
selecting a set of features for a support avatar with which the user is to interact during the interaction, wherein the set of features is selected to be responsive to the emotional state of the user and to be consistent with the set of preferences;
selecting a stored workflow based on the need of the user; and
rendering the support avatar to exhibit the set of features and to present the stored workflow as part of the interaction.

* * * * *